United States Patent
Blaser

(10) Patent No.: US 12,006,597 B2
(45) Date of Patent: Jun. 11, 2024

(54) SPINNING MILL AND METHOD FOR OPERATING SAID SPINNING MILL

(71) Applicant: Maschinenfabrik Rieter AG, Winterthur (CH)

(72) Inventor: Niklaus Blaser, Brütten (CH)

(73) Assignee: Maschinenfabrik Rieter AG, Winterthur (CH)

( * ) Notice: Subject to any disclaimer, the term of this patent is extended or adjusted under 35 U.S.C. 154(b) by 534 days.

(21) Appl. No.: 17/283,996

(22) PCT Filed: Oct. 4, 2019

(86) PCT No.: PCT/IB2019/058459
§ 371 (c)(1),
(2) Date: Apr. 9, 2021

(87) PCT Pub. No.: WO2020/075028
PCT Pub. Date: Apr. 16, 2020

(65) Prior Publication Data
US 2021/0348307 A1 Nov. 11, 2021

(30) Foreign Application Priority Data
Oct. 10, 2018 (EP) ..................... 18199474

(51) Int. Cl.
*G05B 19/4155* (2006.01)
*D01H 13/32* (2006.01)
*H04L 67/53* (2022.01)

(52) U.S. Cl.
CPC .......... *D01H 13/32* (2013.01); *G05B 19/4155* (2013.01); *H04L 67/53* (2022.05); *G05B 2219/37355* (2013.01)

(58) Field of Classification Search
CPC ..... G05B 19/4155; H04L 67/53; D01H 13/32
See application file for complete search history.

(56) References Cited

U.S. PATENT DOCUMENTS 4,835,699 A * 5/1989 Mallard ................ D03J 1/005
377/16
5,515,266 A * 5/1996 Meyer ................... D01H 13/32
57/264
(Continued)

FOREIGN PATENT DOCUMENTS

DE 43 06 095 10/1993
DE 10 2006 025747 A1 12/2007
(Continued)

OTHER PUBLICATIONS

EP Search Report, dated Apr. 5, 2019.
PCT Search Report, dated Dec. 9, 2019.

*Primary Examiner* — Tajash D Patel
(74) *Attorney, Agent, or Firm* — Dority & Manning, P.A.

(57) ABSTRACT

A spinning mill includes textile machines each having an application and an application programming interface in communication with a database, auxiliary spinning mill devices each having an application and an application programming interface in communication with a database, a spinning mill platform having an application and an application programming interface in communication with a database, a spinning mill application having an application programming interface in communication with a database, and a third party application having an application programming interface in communication with a database. The spinning mill platform further includes additional application programming interfaces connected to the application programming interface of the spinning mill application or the third party application. An exchange of information and data is enabled directly: between the databases of the textile machines, the spinning mill platform, the spinning mill application, and the third party application; and between the textile machine applications, the spinning mill platform application, the spinning mill application, the third party (Continued)

application and the databases of the textile machines, the spinning mill platform, the spinning mill application, and the third party application.

24 Claims, 1 Drawing Sheet

(56) References Cited

U.S. PATENT DOCUMENTS

| | | |
|---|---|---|
| 6,675,226 B1 | 1/2004 | Nair et al. |
| 7,917,629 B2 * | 3/2011 | Werner ................... G06F 9/465 |
| | | 709/227 |
| 9,098,312 B2 * | 8/2015 | Bullotta .................. H04L 67/51 |
| 2022/0324115 A1 * | 10/2022 | Rose ....................... B25J 9/1689 |
| 2023/0297955 A1 * | 9/2023 | Goenka .................. G06Q 50/04 |
| | | 705/28 |

FOREIGN PATENT DOCUMENTS

| | | |
|---|---|---|
| EP | 0 712 949 | 5/1996 |
| EP | 3 312 318 A1 | 4/2018 |
| KR | 2018 0003665 A | 1/2018 |
| WO | WO 2017/072683 A1 | 5/2017 |

\* cited by examiner

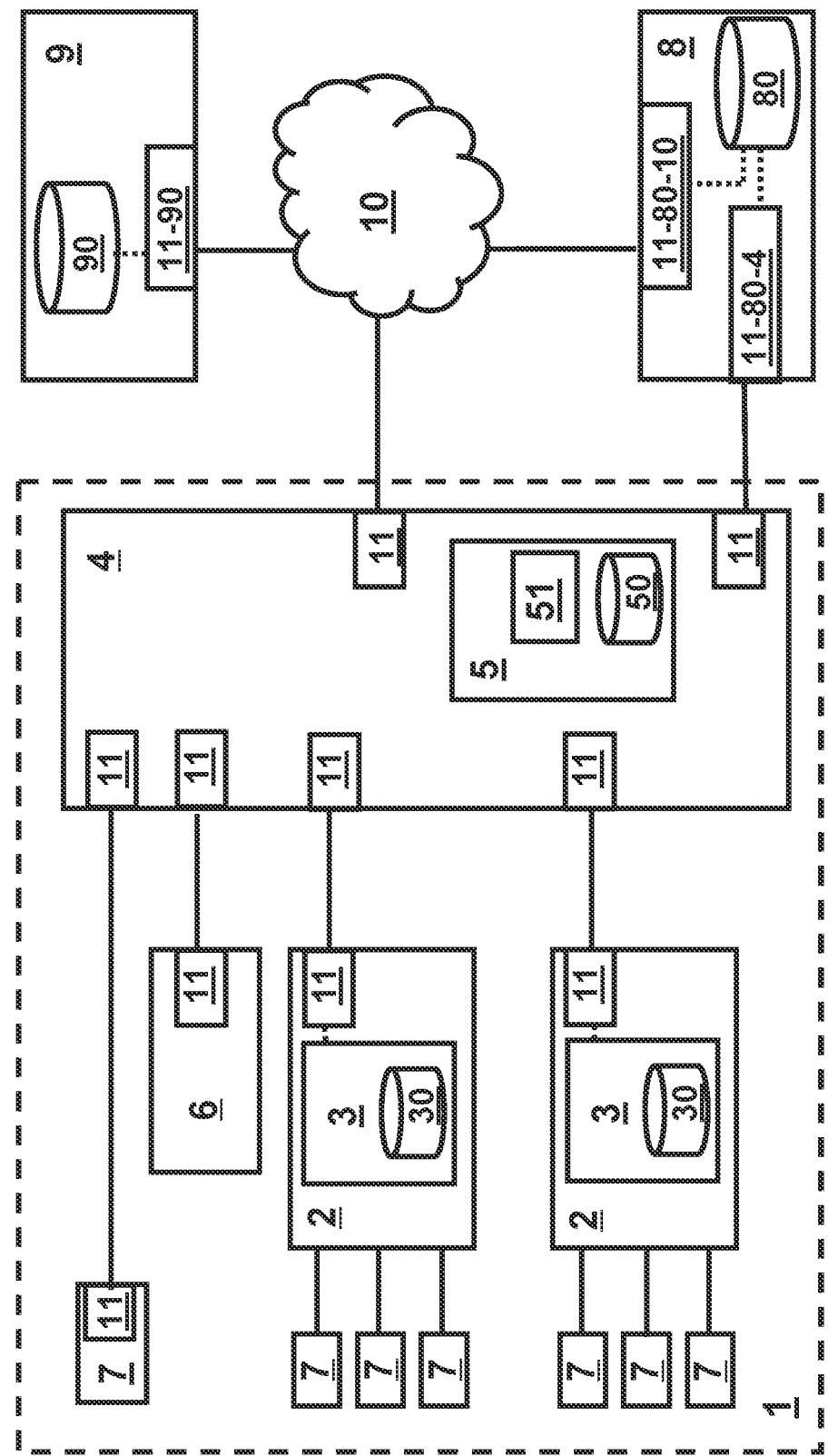

SPINNING MILL AND METHOD FOR OPERATING SAID SPINNING MILL

FIELD OF INVENTION

The invention concerns a spinning mill and a method for operating the spinning mill.

BACKGROUND

DE4306095, FIG. 2, discloses a method and a device for controlling a cross-linked spinning mill. Spinning mill controller and spinning mill platforms are connected today to spinning machines, control devices and third party programs or applications by different communication means like relay contacts, RS232, RS455, CAN or similar communication interfaces or different kinds of file transfer (FTP, SFTP or similar standards).

EP0712949 discloses an installation of a spinning plant, which has groups of machines controlled by a process computer, with each machine having its own controller for the active machine elements. A network provides bidirectional communication between the computer and each machine. Machines are fitted with sensors, essential and redundant to the process, which together provide a picture of the machine condition. The raw sensor data is transmitted over the network to the computer which has software able to evaluate correlations between them. Command signals are transmitted over the network to control the machines.

DE102006025747 discloses an automatic system for controlling textile machines, which comprises means for controlling the textile machines, human machine interface units, and a communication network with wire connection and/or wireless networking between the machine and the units. The human machine interface units are formed as thin-clients, where its functional equipment is bounded to the indication and input of data. Means for retrieving and loading process data and/or software over the communications network on the human machine interface unit of a server is intended. The automatic system for controlling textile machines comprises means for controlling the textile machines, human machine interface units, and a communication network with wire connection and/or wireless networking between the machine and the units.

These types of disclosed connections are well-suited to communicate data from sensing devices, status information or control messages. They are not well suited to interact between different software applications since they are too limited in terms of communication flexibility, speed and volume, specifically thinking about big data communication for analytics. These are serious limits for the future development of spinning mill intelligence based on big data, machine learning and deep learning approaches.

SUMMARY OF THE INVENTION

Additional objects and advantages of the invention will be set forth in part in the following description, or may be obvious from the description, or may be learned through practice of the invention.

A purpose of this invention is to provide a spinning mill and a method for operating the spinning mill which allow precise definitions of information and data to be exchanged between textile machines, spinning mill platforms, spinning mill software applications and third party systems and software applications such as ERP systems, etc. (ERP: Enterprise Resource Planning), in both areas, the spinning mill as well as in the cloud.

Another purpose of the invention is to provide a spinning mill and a method for operating the spinning mill which allow precise definitions of information and data to be exchanged between a spinning mill platform and external, third party software.

The purposes are achieved by a method and spinning mill as described herein.

Specifically, the aim is solved by a spinning mill, which is characterised in that the textile machines and the spinning mill platform are equipped with application programming interfaces connected to a databases of the textile machines and the spinning mill platform. The spinning mill platform is further equipped with application programming interfaces connectable to application programming interfaces of a spinning mill application and/or a third party application equipped with databases connected to the application programming interfaces of the spinning mill application and/or the third party application, thereby enabling to exchange information and/or data directly between the databases and/or between the databases and applications of the textile machines, the spinning mill platform, the spinning mill application and/or the third party application. The application programming interface can be specifically designed for enabling communication flexibility, speed and volume, big data communication for analytics, etc., between the databases and/or between the databases and applications.

The inventive concept for spinning mill systems and/or platforms is based on application programming interfaces (API), specific software modules that allow different software to exchange information and/or data of all kind. According to the present invention, non-limiting examples for building the application programming interface include:

- GraphQL leverages requests of two types—queries retrieving data from the server, and mutations changing the data.
- SOAP operates with the two basic functions—GET and POST. GET is used to retrieve data from the server, while POST is used to add or modify data.
- REST, in its turn, changes the state of the corresponding source by making a request to the URI (Uniform Resource Identifier).
- WSDL (Web Service Description Language) is an XML document that defines the operations, parameters, requests, and responses used in web service interactions.
- OPC Unified Architecture respectively OPC UA (OPC: Open Platform Communications; UA: Unified Architecture) is a machine to machine communication protocol for industrial automation developed by the OPC Foundation.

Advantageously, one or more application programming interfaces of the spinning mill platform enables connecting the spinning mill platform directly or over the internet to the spinning mill or third party application.

Advantageously, one or more application programming interfaces of the spinning mill platform enables connecting the spinning mill platform to a spinning mill application being one of an ERP system, a transport logistic system, or a spinning mill automation system.

Advantageously, one or more application programming interfaces of the spinning mill platform enables connecting the spinning mil platform to a third party application being one or more of a raw material information provider, an end product broker, a logistic company, or a spinning aftermarket system.

Advantageously, the spinning mill includes sensors and/or actors connected over application programming interfaces to the spinning mill platform.

Advantageously, the auxiliary spinning mill devices are connected over application programming interfaces to the spinning mill platform.

Advantageously, the application programming interfaces enable that machine types and counts, failure rate and alarms, efficiency, uptime and shift production, raw and end material stock, spare parts stock, semi-finished goods information, logistics information financial information are exchangeable between spinning mill platform and the spinning mill application.

Advantageously, the application programming interfaces enable that between the third party application and the spinning mill platform one the following information and/or data is exchangeable: financial information, market intelligence information, raw material prices and availability as well as finished good prices.

Advantageously, one or more of the application programming interfaces is built as GraphQL, SOAP, REST, WSDL, and/or OPC Advantageously, one or more of application programming interfaces identify each other by an authentication procedure by OAuth (OAuth: Open Authorization), OAuth2, SAML (SAML: Security Assertion Markup Language), and/or similar authentication mechanism.

Advantageously, the protocol used by the application programming interfaces for accessing the data and information is predefined.

Advantageously, the textile machines are one or a plurality of a bale opener, a card, a regulated or not regulated draw frame, a comber preparation machine or a comber, an end spinning device such as a ring or compact spinning machine, a rotor spinning machine, an air-jet spinning machine, an automatic winder, a roving frame, a weaving machine, a knitting machine, a yarn winding machine, a draw texturing machine.

Advantageously, the auxiliary spinning mill devices are one of air pressure systems, transport systems, climate control systems and security and surveillance systems.

Advantageously, the spinning mill platform comprises an application which compiles or collects information and/or data from the textile machines, the auxiliary spinning devices and/or the sensors visualizes it, analyses it, data mines it, provides predictive and/or normative analyses or providing adaptive control functionality.

A method is provided for operating a spinning mill, the spinning mill comprising a plurality of textile machines, auxiliary spinning devices, and a spinning mill platform for compiling data of the plurality of textile machines, the plurality of textile machines and the spinning mill platform being equipped with application programming interfaces. The method includes exchanging, by means of the application programming interfaces information and/or data between the plurality of textile machines, wherein the spinning mill platform and a spinning mill or third party application are equipped with application programming interfaces connectable to application programming interfaces of the spinning mill platform.

Advantageously, the method comprises the step of exchanging information and/or data between the spinning mill platform and the spinning mill system or application directly or over the internet by means of the application programming interface.

Advantageously, the method comprises the step of exchanging information and/or data between the spinning mill platform and one of an ERP system, a transport logistic system or a spinning mill automation system as spinning mill application.

Advantageously, the method comprises the step exchanging information and/or data between the spinning mill platform and one of raw material information provider, end product broker, logistic companies or spinning aftermarket systems as third party application.

Advantageously, the method comprises the step of exchanging information and/or data between sensors and/or actors and the spinning mill platform over an application programming interface.

Advantageously, the method comprises the step of exchanging information and/or data between the auxiliary spinning devices and the spinning mill platform over an application programming interface.

Advantageously, the method comprises the step of exchanging information and/or data over the application programming interface as GraphQL, SOAP, REST, WSDL, and/or OPC.

Advantageously, the method comprises the step of predefining the protocol used by the application programming interfaces for accessing the data and information.

Advantageously, the method comprises the step of exchanging one or a plurality of machine types and counts, failure rate and alarms, efficiency, uptime and shift production, raw and end material stock, spare parts stock, semi-finished goods information, logistics information financial information between spinning mill platform and the spinning mill application.

Advantageously, the method comprises the step of exchanging one or a plurality of financial information, market intelligence information, raw material prices and availability as well as finished good prices between the third party application and the spinning mill platform.

The benefit of the inventive concept is that software modules within spinning mill applications and programs can interface directly with each other without the need of traditional communication interfaces mentioned under the prior art. The general architecture of spinning mill systems and/or platforms, specifically in the area of software architecture can be designed in an efficient way. In addition, application programming interfaces allow precise definitions of information and data to be exchanged between several systems and/or platforms.

BRIEF DESCRIPTION OF DRAWINGS

The invention will be better understood with the aid of the description of an embodiment given by way of example an illustrated by the figures, in which FIG. 1 shows the general configuration of a spinning mill according to the present invention.

DETAILED DESCRIPTION OF THE INVENTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows schematically the general configuration of a spinning mill 1 according to the present invention. The spinning mill 1 comprises a plurality of textile machines 2, where in FIG. 1 only two are shown as an example. The textile machines 2 can be e.g., a bale opener, a card, a regulated or not regulated draw frame, a comber preparation machine or a comber, an end spinning device such as a ring or compact spinning machine, a rotor spinning machine, an air-jet spinning machine, an automatic winder, a roving frame, a weaving machine, a knitting machine, a yarn winding machine, a draw texturing machine, or the like. Each of the textile machines 2 is provided with programmable control logic (PLC) 3 and a database 30. This database 30 could as well be a storage device in simple machines. The spinning mill 1 further comprises a spinning mill platform 4 (Edge Device), which comprises a central mill control application of the platform, where the overall control of the spinning mill 1 takes place.

The spinning mill platform 4 comprises a local processing means 51, for example a processor, operatively connected to a database 50, for processing of the data stored, and application 5. Such an application 5 could collect information and/or data from the textile machines 2, auxiliary spinning devices 6, and the sensors 7, visualize it, analyse it, data mine it, providing predictive and/or normative analyses or providing adaptive control functionality. Furthermore, the spinning mill platform 4 transmits settings (e.g. specified or desired values) to the plurality of textile machines 2.

Auxiliary spinning devices 6 in spinning mills like air pressure systems, transport systems, climate control systems, security and surveillance systems, and the like, could as well be connected to the spinning mill platform 4.

The textile machines 2 furthermore comprise a plurality of sensors 7 for the detection of a plurality of physical quantities of the machine or machine parts or sections, such as an operating parameter. The number of sensors 7 is shown only as an example and can dependent on the textile machine 2 and the machine parts to be surveyed. During operations, the sensors 7 transmit their measuring values to the corresponding textile machine 2, which collects the information in the storage or database 30 and transmits them to the spinning mill platform 4. Alternatively or additionally, the sensors 7 could transmit their measuring values directly a spinning mill platform 4 for further analysis. Example for sensors 7 in the present invention are sensors for temperature, pressure, vibration, velocity, acceleration, current, voltage, optical, camera or force, a capacitive or inductive measuring sensor or any other sensor, which could monitor the corresponding machine.

Furthermore, a spinning mill application 8 or a similar platform is as well connected to the spinning mill platform 4. Such spinning mill system 8 could be connected directly or over the internet 9 to the spinning mill platform 4.

The spinning mill application 8 comprises a database 80 and comprises, as an example, an ERP system or process- or machine optimizing application (ERP: Enterprise Resource Planning). The spinning mill application 8 could be a central spinning mill application offering special services or collecting, analysing, optimizing and processing data from the spinning mill 1. Between the spinning mill application 8 and the spinning mill platform 4 the following information and/or data could be exchanged: machine types and counts, failure rate and alarms, efficiency, uptime and shift production, spare parts stock, raw and end material stock, semi-finished goods information, logistics information financial information.

Third party application 9 connected to the spinning mill platform 4 comprises one or a plurality of raw material information provider; end product broker; logistic companies and spinning aftermarket systems. Furthermore, it could comprise e-shops for the above mentioned application provider or consumables. Between the third party application 9 and the spinning mill platform 4, the following information and/or data could be exchanged: financial information, market intelligence information, raw material prices and availability, as well as finished good prices.

Thus, as illustrated in FIG. 1, the spinning mill 1 includes applications 3, 5. In particular, the applications 3, 5 include programmable control logics 3 of the textile machines 2 and the application 5 of the spinning mill platform 4. Furthermore, applications 8, 9 are connectable to the spinning mill 1. In particular, the applications 8, 9 include the spinning mill application 8 and the third party application 9.

According to the present invention the communication—wired or wireless—between the spinning mill platform 4 and the textile machines 2, the auxiliary spinning mill device 6, the sensors 7 and actors, the spinning mill application 8 or third party application 9 is based on application programming interfaces (API) 11, which are specific software modules that allow different software to exchange information and/or data of all kind. Application programming interfaces 11 allow precise definitions of information and data to be exchanged between several systems and/or platforms. Information between the spinning mill application 8 or third party application 9 could as well be exchanged on the basis of application programming interfaces (API) 11.

FIG. 1 illustrates application programming interfaces 11 arranged at various locations. For example, application programming interfaces 11 having reference numbers 11-80-4 and 11-80-10 are illustrated in connection with the spinning mill application 8. For example, an application programming interface 11 having reference number 11-90 is illustrated in connection with the third party application 9.

As illustrated in FIG. 1, the application programming interface with reference number 11-80-4 is connected to the spinning mill platform 4 and is connected to the database 80 of the spinning mill application 8, and the application programming interface with reference number 11-80-10 is connected to Internet or IP connectivity (IP: Internet Protocol) 10, which enables connection to the third party application 9, for example, and is connected to the database 80 of the spinning mill application 8. Thus, the application programming interfaces with reference numbers 11-80-4 and 11-80-10 directly have access to database 80.

As illustrated in FIG. 1, the application programming interface with reference number 11-90 is connected to Internet or IP connectivity 10, which enables connection to the spinning mill application 8 or the spinning mill platform 4, for example, and is connected to the database 90 of the third party application 9. Thus the application programming interface with reference number 11-90 directly has access to database 90.

In particular in connection with FIG. 1, the skilled person interprets the present disclosure that each of the application programming interfaces 11 directly has access to the respective databases 30, 50, 80, 90, if applicable, for directly exchanging information and/or data.

In particular in connection with FIG. 1, the skilled person interprets the present disclosure that each of the application programming interfaces 11 of the spinning mill platform 4 is connected to the database 50 of the application 5 of the spinning mill platform 4, and each of the application programming interfaces 11 directly has access to the database 50 of application 5 of the spinning mill platform 4 for directly exchanging information and/or data (not illustrated in FIG. 1 for not questioning clarity of the Figure).

In particular in connection with FIG. 1, the skilled person interprets the present disclosure that each the application programming interfaces 11 of the textile machines 2 is connected to the respective database 30 of programmable control logics 3 of the textile machines 2, and each of the application programming interfaces 11 directly has access to the respective database 30 of programmable logics 3 of the textile machines 2.

Thus, as the skilled person clearly understands, the application programming interfaces 11 enable that information and/or data may directly be exchanged between, for example, the database 50 of the application 5 of the spinning mill platform 4 and the database 80 of the spinning mill application 8, for example. Furthermore, as the skilled person clearly understands, the application programming interfaces 11 enable that information and/or data may directly be exchanged between, for example, the database 50 of the application 5 of the spinning platform 4 and the spinning mill application 8 or the third party application 9, for example.

In particular in connection with FIG. 1, the skilled person interprets the present disclosure that FIG. 1 illustrates applications 3, 5, 8, 9, wherein application programming interfaces 11 are arranged for enabling that information and/or data may directly be exchanged between one of the databases 30, 50, 80, 90 associated with the applications 3, 5, 8, 9 and another one of these databases 30, 50, 80, 90, as well as that information and/or data may directly be exchanged between one of these databases 30, 50, 80, 90 and an application 3, 5, 8, 9 associated with another one of the databases 30, 50, 80, 90.

In particular in connection with FIG. 1, the skilled person interprets the present disclosure that the textile machines 2 and the spinning mill platform 4 are equipped with application programming interfaces 11 connected to databases 30, 50 of the textile machines 2 and the spinning mill platform 4, wherein the spinning mill platform 4 is further equipped with application programming interfaces 11 connectable to application programming interfaces 11 of a spinning mill application 8 and/or a third party application 9 equipped with databases 80, 90 connected to the application programming interfaces 11 of the spinning mill application 8 and/or the third party application 9, thereby enabling to exchange information and/or data directly between the databases 30, 50, 80, 90 and/or between the databases 30, 50, 80, 90 and applications 3, 5, 8, 9 of the textile machines 2, the spinning mill platform 4, the spinning mill application 8 and/or the third party application 9.

Preferably, according to the present invention, the application programming interface 11 can be built in different manners. Non-limiting examples are:

GraphQL leverages requests of two types—queries retrieving data from the server, and mutations changing the data.

SOAP operates with the two basic functions—GET and POST. GET is used to retrieve data from the server, while POST is used to add or modify data.

REST, in its turn, changes the state of the corresponding source by making a request to the URI (Uniform Resource Identifier).

WSDL (Web Service Description Language) is an XML document that defines the operations, parameters, requests, and responses used in web service interactions.

OPC Unified Architecture respectively OPC UA (OPC: Open Platform Communications; UA: Unified Architecture) is a machine to machine communication protocol for industrial automation developed by the OPC Foundation.

The application programming interfaces 11 identify each other by an authentication procedure by OAuth, OAuth2, SAML or similar mechanism.

The benefit of this concept is that software modules within spinning mill applications and programs can interface directly with each other without the need of traditional communication interfaces mentioned above. For example, the application programming interfaces 11 can include a synchronisation module for automatically synchronizing information and data between the databases 30, 50, 80, 90. The synchronization modules can include synchronization tables for defining synchronization strategies, for example as regards which parts of the databases 30, 50, 80, 90 get synchronized under which conditions, such as time of day, network load, etc. The general architecture of spinning mill systems and/or platforms, specifically in the area of software architecture can be designed in an efficient way. In addition, it allows precise definition and limitation of the information and/or data to be exchanged. For example, the application programming interfaces 11 can have assigned different permission for accessing the databases 30, 50, 80, 90. As regards the spinning mill platform 4, for example, a set of application programming interfaces 11 interfacing with the textile machines 2 and auxiliary spinning devices 6 can have assigned a first permission and the set of application programming interfaces 11 interfacing with the spinning mill application 8 and third party application 9 can have assigned a second permission, wherein the first permission and the second permission have assigned different access levels to the database 50 of the spinning mill platform 4, for example as regards reading of data from the database 50, writing of data to the database 50, etc., thereby enabling improved security.

Modifications and variations can be made to the embodiments illustrated or described herein without departing from the scope and spirit of the invention as set forth in the appended claims.

REFERENCE NUMBERS

1 Spinning mill
2 Textile machine
3 Programmable control logic (PLC)
30 Database
4 Spinning mill platform
5 Application
50 Database
51 Local Processing Means
6 Auxiliary spinning mill device
7 Sensor
8 Spinning mill application
80 Database
9 Third party application
90 Database
10 Internet or IP connectivity
11 Application Programming Interface (API)

The invention claimed is:

1. A spinning mill, comprising:
   a plurality of textile machines each comprising a textile machine application and a textile machine application programming interface in communication with a textile machine database;
   a plurality of auxiliary spinning mill devices each comprising an auxiliary spinning mill application and an auxiliary spinning mill application programming interface in communication with an auxiliary spinning mill database;
   a spinning mill platform comprising a spinning mill platform application and a spinning mill platform application programming interface in communication with a spinning mill platform database, the spinning mill platform configured to compile data on the textile machines and transmit settings to the textile machines;
   a spinning mill application comprising a spinning mill application programming interface in communication with a spinning mill database;
   a third party application comprising a third party application programming interface in communication with a third party database;
   the spinning mill platform further comprising a first additional application programming interface connected to of the spinning mill application programming interface and a second additional application programming interface connected to the third party application programming interface; and
   wherein an exchange of information and data is enabled directly: (1) between the textile machine database, the spinning mill platform, the spinning mill application, and the third party application; and (2) between the textile machine application, the spinning mill platform application, the spinning mill application, the third party application, the textile machine database, the spinning mill platform database, the spinning mill application database, and the third party application database.

2. The spinning mill according to claim 1, wherein the spinning mill platform application programming interface connects the spinning mill platform directly or via an internet connection to the spinning mill application or the third party application.

3. The spinning mill according to claim 2, wherein the spinning mill application is one of an ERP system, a transport logistic system, or a spinning mill automation system.

4. The spinning mill according to claim 2, wherein the third party application is one of a raw material information provider, an end product broker, a logistic company, or a spinning aftermarket system.

5. The spinning mill according to claim 1, further comprising sensors or actors connected to the spinning mill platform via sensor application programming interfaces.

6. The spinning mill according to claim 1, wherein the auxiliary spinning mill application programming interfaces are connected to the spinning mill platform.

7. The spinning mill according to claim 1, wherein the spinning mill application programming interfaces and the spinning mill platform enable exchange of information or data for one or more of machine types and counts, failure rate and alarms, efficiency, uptime and shift production, raw and end material stock, spare parts stock, semi-finished goods information, logistics information, or financial information between the spinning mill platform and the spinning mill application.

8. The spinning mill according to claim 1, wherein the third party application programming interface and the spinning mill platform enable exchange of information or data for one or more of financial information, market intelligence information, raw material prices and availability, or finished good prices between the third party application and the spinning mill platform.

9. The spinning mill according to claim 1, wherein the following are built as GraphQL, SOAP, REST, WSDL, or OPC: textile machine application programming interface; the auxiliary spinning mill application programming interface; the spinning mill platform application programming interface; the spinning mill application programming interface; the third party application programming interface; the first additional application programming interface; and the second additional application programming interface.

10. The spinning mill according to claim 1, wherein the following are identifiable to each other by an authentication procedure using OAuth, OAuth2, or SAML: textile machine application programming interface; the auxiliary spinning mill application programming interface; the spinning mill platform application programming interface; the spinning mill application programming interface; the third party application programming interface; the first additional application programming interface; and the second additional application programming interface.

11. The spinning mill according to claim 1, wherein the following comprise a predefined protocol to access data or information: textile machine application programming interface; the auxiliary spinning mill application programming interface; the spinning mill platform application programming interface; the spinning mill application programming interface; the third party application programming interface; the first additional application programming interface; and the second additional application programming interface.

12. The spinning mill according to claim 1, wherein the textile machines comprise one or more of a bale opener, a card, a regulated or non-regulated draw frame, a comber preparation machine or a comber, an end spinning machine, a rotor spinning machine, an air-jet spinning machine, an automatic winder, a roving frame, a weaving machine, a knitting machine, a yarn winding machine, or a draw texturing machine.

13. The spinning mill according to claim 1, wherein the auxiliary spinning mill devices comprise one or more of air pressure systems, transport systems, climate control systems, or security and surveillance systems.

14. The spinning mill according to claim 1, wherein the spinning mill platform application compiles or collects information or data from one or more of the textile machines, the auxiliary spinning devices, or the sensors and uses the information or data to provide predictive or normative analyses or adaptive control functionality.

15. A method for operating the spinning mill according to claim 1, comprising exchanging information or data between the plurality of textile machines, the spinning mill platform, the spinning mill application, and the third party application via the textile machine application programming interface, the spinning mill platform application programming interface, the spinning mill application programming interface, and the third party application programming interface.

16. The method according to claim 15, wherein the information or data is exchanged via an internet connection.

17. The method according to claim 15, wherein the spinning mill application is one of an ERP system, a transport logistic system, or a spinning mill automation system.

18. The method according to claim 15, wherein the third party application is one of a raw material information provider, an end product broker, a logistic company, or a spinning aftermarket system.

19. The method according to claim 15, further comprising connecting sensors or actors to the spinning mill platform via application programming interfaces configured with the sensors.

20. The method according to claim 15, further comprising exchanging the information or data between the auxiliary spinning mill application programming interface and the spinning mill platform application programming interface.

21. The method according to claim 15, wherein the information or data is exchanged as GraphQL, SOAP, REST, WSDL, or OPC.

22. The method according to claim 15, wherein the information or data is exchanged via predefined protocol.

23. The method according to claim 15, where the information or data exchanged between the spinning mill application and the spinning mill platform is one or more of a plurality of machine types and counts, failure rate and alarms, efficiency, uptime and shift production, raw and end material stock, spare parts stock, semi-finished goods information, logistics information, or financial information.

24. The method according to claim 15, where the information or data exchanged between the third party application and the spinning mill platform is one or more of financial information, market intelligence information, raw material prices and availability, or finished good prices.

* * * * *